(12) United States Patent
Vanhecke et al.

(10) Patent No.: US 10,316,209 B2
(45) Date of Patent: *Jun. 11, 2019

(54) SELF-DISPERSING PIGMENTS

(71) Applicant: CHEMOURS COMPANY TT LLC, Wilmington, DE (US)

(72) Inventors: Franck Andre Vanhecke, Lebbeke (BE); Mitchell Scott Chinn, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 167 days.

This patent is subject to a terminal disclaimer.

(21) Appl. No.: 14/441,235

(22) PCT Filed: Oct. 24, 2013

(86) PCT No.: PCT/US2013/066480
§ 371 (c)(1),
(2) Date: May 7, 2015

(87) PCT Pub. No.: WO2014/078039
PCT Pub. Date: May 22, 2014

(65) Prior Publication Data
US 2015/0291822 A1    Oct. 15, 2015

Related U.S. Application Data

(60) Provisional application No. 61/725,597, filed on Nov. 13, 2012.

(51) Int. Cl.
| | | |
|---|---|---|
| C09D 17/00 | (2006.01) |
| C09C 1/36 | (2006.01) |
| C09C 1/40 | (2006.01) |
| C09C 3/00 | (2006.01) |
| C09C 3/06 | (2006.01) |
| C09C 3/08 | (2006.01) |
| C09C 1/02 | (2006.01) |
| C09C 1/04 | (2006.01) |
| C09C 1/16 | (2006.01) |
| D21H 27/26 | (2006.01) |
| D21H 27/30 | (2006.01) |
| D21H 17/67 | (2006.01) |
| D21H 17/69 | (2006.01) |

(52) U.S. Cl.
CPC ............ C09D 17/008 (2013.01); C09C 1/021 (2013.01); C09C 1/027 (2013.01); C09C 1/043 (2013.01); C09C 1/16 (2013.01); C09C 1/3661 (2013.01); C09C 1/3669 (2013.01); C09C 1/3692 (2013.01); C09C 1/407 (2013.01); C09C 3/006 (2013.01); C09C 3/063 (2013.01); C09C 3/08 (2013.01); D21H 17/675 (2013.01); D21H 17/69 (2013.01); D21H 27/26 (2013.01); D21H 27/30 (2013.01); C01P 2002/02 (2013.01); C01P 2004/84 (2013.01); C01P 2006/12 (2013.01)

(58) Field of Classification Search
CPC .............. C01P 2002/02; C01P 2004/84; C01P 2006/12; C09C 1/021; C09C 1/027; C09C 1/043; C09C 1/16; C09C 1/3661; C09C 1/3669; C09C 1/3692; C09C 1/407; C09C 3/006; C09C 3/063; C09C 3/08; C09D 17/008
See application file for complete search history.

(56) References Cited

U.S. PATENT DOCUMENTS

| | | | | |
|---|---|---|---|---|
| 3,573,081 A * | 3/1971 | Dietz | ............... | C09C 3/08 106/253 |
| 5,665,466 A | 9/1997 | Anny et al. | | |
| 5,976,237 A * | 11/1999 | Halko | ............... | C09C 3/063 106/436 |
| 5,993,533 A | 11/1999 | Diebold et al. | | |
| 6,200,375 B1 | 3/2001 | Guez et al. | | |
| 6,231,662 B1 * | 5/2001 | Atkinson | ............... | B82Y 30/00 106/436 |
| 6,743,286 B2 | 6/2004 | Wen et al. | | |
| 6,890,652 B2 | 5/2005 | Schulz | | |
| 6,962,622 B2 | 11/2005 | Juergen et al. | | |
| 7,285,162 B2 | 10/2007 | Hua et al. | | |
| 7,288,146 B1 | 10/2007 | Drews et al. | | |
| 7,686,882 B2 | 3/2010 | Fu-Chu et al. | | |
| 7,842,131 B2 | 11/2010 | Blumel et al. | | |
| 9,546,450 B2 * | 1/2017 | Vanhecke | ............... | C09C 1/36 |
| 9,551,112 B2 * | 1/2017 | Vanhecke | ............... | C09C 1/36 |
| 2006/0078485 A1 | 4/2006 | Thiele et al. | | |
| 2006/0275597 A1 | 12/2006 | Thiele | | |
| 2015/0259537 A1 | 9/2015 | Chinn et al. | | |
| 2015/0337138 A1 | 11/2015 | Vanhecke et al. | | |

FOREIGN PATENT DOCUMENTS

| | | |
|---|---|---|
| EP | 0632109 A1 | 1/1995 |
| EP | 1 726 625 A | 11/2006 |
| JP | 7-18199 A | 1/1995 |
| JP | 2000-110098 A | 4/2000 |
| JP | 2006-124684 A | 5/2006 |
| JP | 2010-6629 A | 1/2010 |
| WO | 9935335 A1 | 7/1999 |

* cited by examiner

*Primary Examiner* — Shuangyi Abu Ali

(57) ABSTRACT

The disclosure provides self-dispersing pigment having an isoelectric point of at least about 8 comprising an inorganic particle, and in particular a titanium dioxide ($TiO_2$) pigment, treated sequentially by: hydrolyzing an aluminum compound or basic aluminate to deposit a hydrous alumina surface; and adding a dual-functional compound comprising an anchoring group that attaches the dual-functional compound to the pigment surface, and a basic amine group comprising a primary, secondary or tertiary amine. These self-dispersing pigments are useful in making décor paper that may be used in paper laminates.

17 Claims, No Drawings

SELF-DISPERSING PIGMENTS

BACKGROUND OF THE DISCLOSURE

The present disclosure pertains to self-dispersing inorganic particles, and in particular to titanium dioxide pigments and their use in décor paper and paper laminates made from such paper.

Paper laminates are in general well-known in the art, being suitable for a variety of uses including table and desk tops, countertops, wall panels, floor surfacing and the like. Paper laminates have such a wide variety of uses because they can be made to be extremely durable, and can be also made to resemble (both in appearance and texture) a wide variety of construction materials, including wood, stone, marble and tile, and they can be decorated to carry images and colors.

Typically, the paper laminates are made from décor paper by impregnating the paper with resins of various kinds, assembling several layers of one or more types of laminate papers, and consolidating the assembly into a unitary core structure while converting the resin to a cured state. The type of resin and laminate paper used, and composition of the final assembly, are generally dictated by the end use of the laminate.

Decorative paper laminates can be made by utilizing a decorated paper layer as the visible paper layer in the unitary core structure. The remainder of the core structure typically comprises various support paper layers, and may include one or more highly-opaque intermediate layers between the decorative and support layers so that the appearance of the support layers does not adversely impact the appearance of decorative layer.

Paper laminates may be produced by both low- and high-pressure lamination processes.

Décor papers typically comprise fillers such as titanium dioxide to increase brightness and opacity to the paper. Typically, these fillers are incorporated into the fibrous paper web by wet end addition.

Often encountered in the décor paper making process are conditions where the pigment interacts with furnish components like wet strength resin and/or paper fibers in such a way that is detrimental to formation of the paper matrix. This negative interaction can be manifested as a loss in paper tensile strength (wet or dry), or a mottled appearance in the finished sheet, or poor opacity. Thus a need exists for a self-dispersing pigment that exhibits improved compatibility with components in the paper making furnish.

SUMMARY OF THE DISCLOSURE

In a first aspect, the disclosure provides a self-dispersing pigment having an isoelectric point of at least about 8, more typically about 8 to about 10, comprising an inorganic particle, more typically a titanium dioxide ($TiO_2$) pigment, treated sequentially by:
 (a) hydrolyzing an aluminum compound or basic aluminate to deposit a hydrous alumina surface; and
 (b) adding a dual-functional compound comprising
  i. an anchoring group that attaches the dual-functional compound to the pigment surface, and
  ii. a basic amine group comprising a primary, secondary or tertiary amine.

In the first aspect, the disclosure provides a self-dispersing pigment wherein the anchoring group is a carboxylic acid functional group comprising an acetate or salts thereof; a di-carboxylic acid group comprising malonate, succinate, glutarate, adipate or salts thereof; an oxoanion functional group comprising a phosphate, phosphonate, sulfate, or sulfonate; or a substituted 1,3-diketone or a substituted 3-ketoamide.

In the first aspect, the disclosure provides a self-dispersing pigment wherein the basic amine group is ammine; N-methyl, ethyl, propyl, butyl, cyclopentyl, or cyclohexylamine; or N,N-dimethyl, diethyl, dipropyl, dibutyl, dicyclopentyl, dicyclohexyl amine or mixed dialkylamines such as N,N-methylethyl, etc. More typically utilized amine groups comprise ammine ($—NH_2$), N-methyl amine, or N,N-dimethyl amine.

In the first aspect, the disclosure provides a self-dispersing pigment further comprising a tethering group that chemically connects the anchoring group to the basic amine group, wherein the tethering group comprises:
 (a) an alkyl chain of 1-8 carbon atoms; more typically 1-4 carbon atoms;
 (b) a polyetheramine comprising poly(oxyethylene) or poly(oxypropylene), or mixtures thereof, whereby the weight average molecular weight of the tether is about 220 to about 2000; e.g. Jeffamine® D, ED, and EDR series; or
 (c) a carbon, oxygen, nitrogen, phosphorous, or sulfur atom at the attachment point to the anchoring group.

In the first aspect, the disclosure provides a self-dispersing pigment wherein the dual functional compound comprises alpha-omega aminoacids such as beta-alanine, gamma-aminobutyric acid, and epsilon-aminocaproic acid; alpha-amino acids such as lysine, argenine, aspartic acid or salts thereof.

In the first aspect, the disclosure provides a self-dispersing pigment wherein the dual-functional compound comprises:
 (i) an aminomalonate derivative having the structure:

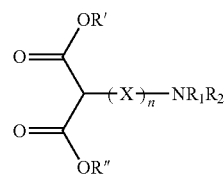

wherein X is a tethering group that chemically connects the anchoring group to the basic amine group as described above;
R' and R" are each individually selected from hydrogen, alkyl, cycloalkyl, alkyl-aryl, alkenyl, cycloalkenyl, alkene, alkylene, arylene, alkylarylene, arylalkylene or cycloalkylene;
$R_1$ and $R_2$ are each individually selected from hydrogen, alkyl, cycloalkyl, alkenyl, cycloalkenyl, alkene, alkylene, or cycloalkylene; and
n=0-50;
 (ii) an aminosuccinate derivative having the structure:

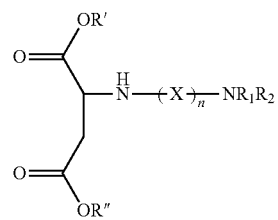

wherein X is a tethering group that chemically connects the anchoring group to the basic amine group as described above;

R' and R" are each individually selected from hydrogen, alkyl, cycloalkyl, alkyl-aryl, alkenyl, cycloalkenyl, alkene, alkylene, arylene, alkylarylene, arylalkylene or cycloalkylene;

$R_1$ and $R_2$ are each individually selected from hydrogen, alkyl, cycloalkyl, alkenyl, cycloalkenyl, alkene, alkylene, or cycloalkylene; and n=0-50;

(iii) a 2,4-pentandione derivative having the structure:

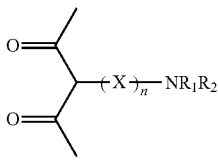

wherein X is a tethering group that chemically connects the anchoring group to the basic amine group as described above;

$R_1$ and $R_2$ are each individually selected from hydrogen, alkyl, cycloalkyl, alkenyl, cycloalkenyl, alkene, alkylene, and cycloalkylene; and n=0-50; or (iv) a 3-ketobutanamide derivative having the structure:

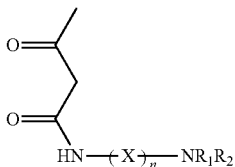

wherein X is a tethering group that chemically connects the anchoring group to the basic amine group $R_1$ and $R_2$ are each individually selected from hydrogen, alkyl, cycloalkyl, alkenyl, cycloalkenyl, alkene, alkylene, and cycloalkylene.

In the first aspect, the disclosure provides a self-dispersing pigment wherein X comprises methylene, oxyethane, or oxypropane groups wherein n=0 to 50; or polyetheramine co-polymers comprising both oxoethylene and oxopropylene monomers.

In the first aspect, the disclosure provides slurry comprising a self-dispersing pigment comprising pigment solids of 10% and having a pH of the pigment slurry less than about 7, more typically about 5 to about 7.

In the first aspect, the disclosure provides a self-dispersing pigment having a surface area of at least 15 m²/g.

In a second aspect, the disclosure provides a process for preparing a self-dispersing pigment comprising (a) adding a dual functional compound with an acidic aluminum salt to form an aqueous solution, wherein the dual functional compound comprises:

i an anchoring group that attaches the dual-functional compound to the pigment surface, and ii a basic amine group comprising a primary, secondary or tertiary amine;

(b) adding a base to the mixture from step (a) whereby the pH is raised to about 4 to about 9 to form a turbid solution; and (c) adding the mixture from step (b) to a slurry of inorganic particles, in particular $TiO_2$ pigment particles whereby a hydrous alumina and the dual functional compound comprise a surface treatment.

In the second aspect, the disclosure provides a process for preparing a self-dispersing pigment wherein the acidic aluminum salt comprises aluminum sulfate hydrate, aluminum chloride hydrate, or aluminum nitrate hydrate and wherein the base comprises sodium hydroxide, sodium carbonate, or ammonium hydroxide.

By "self-dispersing pigment" we mean a pigment with an attribute that is achieved when the pigment zeta potential becomes a dominant force keeping pigment particles separated, i.e., dispersed in the aqueous phase. This force may be strong enough to separate weakly agglomerated pigment particles when suspended in an aqueous medium under low shear conditions. Since the zeta potential varies as a function of solution pH and ionic strength, ideally pigment particles maintain sufficient like-charge providing a repulsive force thereby keeping the particles separated and suspended.

DETAILED DESCRIPTION OF THE DISCLOSURE

In this disclosure "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

In this disclosure, when an amount, concentration, or other value or parameter is given as either a range, typical range, or a list of upper typical values and lower typical values, this is to be understood as specifically disclosing all ranges formed from any pair of any upper range limit or typical value and any lower range limit or typical value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

In this disclosure, terms in the singular and the singular forms "a," "an," and "the," for example, include plural referents unless the content clearly dictates otherwise. Thus, for example, reference to "$TiO_2$ particle", "the $TiO_2$ particle", or "a $TiO_2$ particle" also includes a plurality of $TiO_2$ particles.

Inorganic Particle:

The inorganic particle is typically an inorganic metal oxide or mixed metal oxide pigment particle, more typically a titanium dioxide particle that may be a pigment or a nanoparticle, wherein the inorganic particle, typically inorganic metal oxide or mixed metal oxide particle, more typically titanium dioxide particle provides enhanced compatibility in a décor paper furnish. By inorganic particle it is meant an inorganic particulate material that becomes dispersed throughout a final product such as a décor paper composition and imparts color and opacity to it. Some examples of inorganic particles include but are not limited to ZnO, $TiO_2$, $SrTiO_3$, $BaSO_4$, $PbCO_3$, $BaTiO_3$, $Ce_2O_3$, $Al_2O_3$, $CaCO_3$ and $ZrO_2$.

Titanium Dioxide Pigment:

Titanium dioxide (TiO$_2$) pigment useful in the present disclosure may be in the rutile or anatase crystalline form, with the rutile form being typical. It is commonly made by either a chloride process or a sulfate process. In the chloride process, TiCl$_4$ is oxidized to TiO$_2$ particles. In the sulfate process, sulfuric acid and ore containing titanium are dissolved, and the resulting solution goes through a series of steps to yield TiO$_2$. Both the sulfate and chloride processes are described in greater detail in "The Pigment Handbook", Vol. 1, 2nd Ed., John Wiley & Sons, NY (1988), the relevant teachings of which are incorporated herein by reference for all purposes as if fully set forth.

By "pigment" it is meant that the titanium dioxide particles have an average size of less than about 1 micron. Typically, the particles have an average size of from about 0.020 to about 0.95 microns, more typically from about 0.050 to about 0.75 microns, and most typically from about 0.075 to about 0.50 microns. Also typical are pigments with a specific gravity in the range of about 3.5 to about 6 g/cc.

The untreated titanium dioxide pigment may be surface treated. By "surface treated" it is meant titanium dioxide pigment particles have been contacted with the compounds described herein wherein the compounds are adsorbed on the surface of the titanium dioxide particle, or a reaction product of at least one of the compounds with the titanium dioxide particle is present on the surface as an adsorbed species or chemically bonded to the surface. The compounds or their reaction products or combination thereof may be present as a treatment, in particular a coating, either single layer or double layer, continuous or non-continuous, on the surface of the pigment.

For example, the titanium dioxide particle, typically a pigment particle, may bear one or more surface treatments. The outermost treatment may be obtained by sequentially
(a) hydrolyzing an aluminum compound or basic aluminate to deposit a hydrous alumina surface; and
(b) adding a dual-functional compound comprising:
(i) an anchoring group that attaches the dual-functional compound to the pigment surface, and
(ii) a basic amine group comprising a primary, secondary or tertiary amine.

The aluminum compound or basic aluminate results in an hydrous alumina treatment on the surface, typically the outermost surface, of the titanium dioxide particle and it is present in the amount of at least about 3% of alumina, more typically about 4.5 to about 7%, based on the total weight of the treated titanium dioxide particle. Some suitable aluminum compounds and basic aluminates include aluminum sulfate hydrate, aluminum chloride hydrate, or aluminum nitrate hydrate and alkali aluminates, and more typically sodium or potassium aluminate.

The dual-functional compound comprises an anchoring group that attaches the dual-functional compound to the pigment surface, typically the outermost surface, and a basic amine group comprising a primary, secondary or tertiary amine. The anchoring group may be a carboxylic acid functional group comprising an acetate or salts thereof; a di-carboxylic acid group comprising malonate, succinate, glutarate, adipate or salts thereof; an oxoanion functional group comprising a phosphate, phosphonate, sulfate, or sulfonate; or a diketone such as a C3 substituted 2,4-pentanedione or a substituted 3-ketobutanamide derivative. The dual functional compound is present in an amount of less than 10% by weight, based on the weight of treated pigment, more typically about 0.4% to about 3%, based on the weight of treated pigment.

Substituents on the basic amine group are selected from the group consisting of hydrogen, alkyl, cycloalkyl, alkenyl, cycloalkenyl, alkene, alkylene, or cycloalkylene, more typically short chain alkyls comprising methyl, ethyl, or propyl, and still more typically ammine.

The dual functional compound may comprise alpha-omega aminoacids such as beta-alanine, gamma-aminobutyric acid, and epsilon-aminocaproic acid; alpha-amino acids such as lysine, argenine, aspartic acid or salts thereof.

Alternately, the dual-functional compound comprises an aminomalonate derivative having the structure:

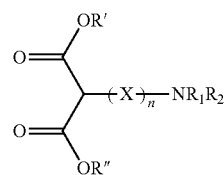

wherein X is a tethering group that chemically connects the anchoring group to the basic amine group;

R' and R" are each individually selected from hydrogen, alkyl, cycloalkyl, alkyl-aryl, alkenyl, cycloalkenyl, alkene, alkylene, arylene, alkylarylene, arylalkylene or cycloalkylene; more typically hydrogen, alkyl of 1 to 8 carbon atoms, aryl of 6 to 8 carbon atoms, and still more typical where R' and R" are selected from hydrogen, methyl, or ethyl.

R$_1$ and R$_2$ are each individually selected from hydrogen, alkyl, cycloalkyl, alkenyl, cycloalkenyl, alkene, alkylene, or cycloalkylene, more typically short chain alkyls comprising methyl, ethyl, or propyl, and still more typically ammine; and n=0-50.

Typically, when X is methylene, n=1-8, and more typically n=1-4. When X is oxymethylene or oxypropylene, n ranges from 2.5 to 50, more typically 6-18. Some examples of aminomalonate derivatives include methyl and ethyl esters of 2-(2-aminoethyl)malonic acid, more typically 2-(2-aminoethyl)dimethylmalonate.

The dual functional compound may alternately comprise an aminosuccinate derivative having the structure:

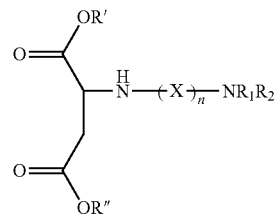

wherein X is a tethering group that chemically connects the anchoring group to the basic amine group and R' and R" are each individually selected from hydrogen, alkyl, cycloalkyl, alkyl-aryl, alkenyl, cycloalkenyl, alkene, alkylene, arylene, alkylarylene, arylalkylene or cycloalkylene; more typically hydrogen, alkyl of 1 to 8 carbon atoms, aryl of 6 to 8 carbon atoms, and still more typically where R' and R" are hydrogen, methyl, or ethyl.

R$_1$ and R$_2$ are each individually selected from hydrogen, alkyl, cycloalkyl, alkenyl, cycloalkenyl, alkene, alkylene, or cycloalkylene, more typically short chain alkyls comprising methyl, ethyl, or propyl, and still more typically ammine;

and
n=0-50.

Typically, when X is methylene, n=1-8, and more typically n=1-4. When X is oxymethylene or oxypropylene, n ranges from 2.5 to 50, more typically 6-18. Some examples of aminosuccinate derivatives include the methyl and ethyl esters of N-substituted aspartic acid, more typically N-(2-aminoethyl)aspartic acid.

The dual functional compound may alternately comprise an acetoacetate derivative having the structure:

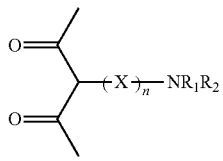

wherein X is a tethering group that chemically connects the anchoring group to the basic amine group and $R_1$ and $R_2$ are each individually selected from hydrogen, alkyl, cycloalkyl, alkenyl, cycloalkenyl, alkene, alkylene, or cycloalkylene, more typically short chain alkyls comprising methyl, ethyl, or propyl, and still more typically ammine; and n=0-50.

Typically, when X is methylene, n=1-8, and more typically n=1-4. When X is oxymethylene or oxypropylene, n ranges from 2.5 to 50, more typically 6-18. An example of an acetoacetate derivative is 3-(2-aminoethyl)-2,4-pentanedione.

The dual functional compound may alternately comprise a 3-ketoamide (amidoacetate) derivative having the structure:

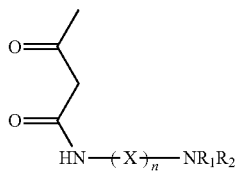

wherein X is a tethering group that chemically connects the anchoring group to the basic amine group and $R_1$ and $R_2$ are each individually selected from hydrogen, alkyl, cycloalkyl, alkenyl, cycloalkenyl, alkene, alkylene, or cycloalkylene, more typically short chain alkyls comprising methyl, ethyl, or propyl, and still more typically ammine; and n=0-50.

Typically, when X is methylene, n=1-8, and more typically n=1-4. When X is oxymethylene or oxypropylene, n ranges from 2.5 to 50, more typically 6-18. Some examples of amidoacetate derivatives include the ethylenediamine and diethylenetriamine amides, more typically N-(2-aminoethyl)-3-oxo-butanamide.

Since the tendency to raise the pigment IEP is proportional to the amount of amine functionality imparted to the pigment surface, it is appropriate to express the molar amount of dual functional compound added to 100 g of treated pigment as the millimolar % of N-added. For example, amounts of dual functional compound used to effectively raise pigment IEP ranged from 2 mmole % to 10 mmole %, more typically 4 mmole % to 8 mmole %. Thus for typical, low molecular weight, dual functional compound beta-alanine, a dosage of 5 mmole % translates into 0.45 weight %. In contrast, in a high molecular weight example, the Jeffamine ED-2003 (m.w.~2000) adduct of 3-ketobutanamide, requires 10.4 weight % to deliver 5 mmole % amine equivalents.

The dual functional compound further comprises a tethering group that chemically connects the anchoring group to the basic amine group, wherein the tethering group comprises,
(a) an alkyl group of 1-8 carbon atoms; more typically 1-4 carbon atoms;
(b) a polyetheramine comprising poly(oxyethylene) or poly(oxypropylene), or mixtures thereof, whereby the weight average molecular weight of the tethering group is about 220 to about 2000. Some examples of (b) include Jeffamine® D, ED, and EDR series A carbon, oxygen, nitrogen, phosphorous, or sulfur atom can be at the attachment point from the tether to the anchoring group.

In one specific embodiment, in the dual functional compound used to prepare the self-dispersing pigment, X comprises methylene, oxyethane, or oxypropane groups, wherein n=0 to 50; or polyetheramine co-polymers comprising both oxoethylene and oxopropylene monomers.

In slurries made using the self-dispersing pigment, the pigment solids comprise at least about 10%, more typically 35% and the pH of the pigment slurry is less than about 7, more typically about 5 to about 7. The self-dispersing pigment has surface area at least 15 $m^2/g$, more typically 25-35 $m^2/g$.

Alternately, the treated inorganic particle, in particular a titanium dioxide particle, may comprise at least one further oxide treatment, for example silica, alumina, zirconia or ceria, aluminosilicate or aluminophosphate. This alternate treatment may be present in the amount of the amount about 0.1 wt % to about 20 wt %, typically from about 0.5 wt % to about 5 wt %, and more typically from about 0.5 wt % to about 1.5 wt %, based on the total weight of the treated titanium dioxide particle. The treatment may be applied by methods known to one skilled in the art. A typical method of adding a silica treatment to the $TiO_2$ particle is by wet treatment similar to that disclosed in U.S. Pat. No. 5,993,533. An alternate method of adding a silica treatment to the $TiO_2$ particle is by deposition of pyrogenic silica onto a pyrogenic titanium dioxide particle, as described in U.S. Pat. No. 5,992,120, or by co-oxygenation of silicon tetrachloride with titanium tetrachloride, as described in U.S. Pat. Nos. 5,562,764, and 7,029,648 which are incorporated herein by reference. Other pyrogenically-deposited metal oxide treatments include the use of doped aluminum alloys that result in the generation of a volatile metal chloride that is subsequently oxidized and deposited on the pigment particle surface in the gas phase. Co-oxygenation of the metal chloride species yields the corresponding metal oxide. Thus using a silicon-aluminum or a tungsten-aluminum alloy resulted in deposition of the corresponding silica and tungsten oxides, respectively. Patent Publications WO2011/059938A1 and WO2012/039730A1 describe these procedures in greater detail and are incorporated herein by reference.

Typically, the oxide treatment provided may be in two layers wherein the first layer comprises at least about 3.0% of alumina, more typically about 5.5 to about 6%, based on the total weight of the treated titanium dioxide particle, and at least about 1% of phosphorous pentoxide, $P_2O_5$, more typically about 1.5% to about 3.0% of phosphorous pentoxide, $P_2O_5$, based on the total weight of the treated titanium dioxide particle. In a specific embodiment, the second layer of oxide on the titanium dioxide pigment comprises silica present in the amount of at least about 1.5%, more typically about 6 to about 14%, and still more typically about 9.5 to about 12%, based on the total weight of the treated titanium dioxide particle.

The titanium dioxide pigment that is to be surface treated may also bear one or more metal oxide and/or phosphated surface treatments, such as disclosed in U.S. Pat. Nos. 4,461,810, 4,737,194 and WO2004/061013 (the disclosures of which are incorporated by reference herein. These coatings may be applied using techniques known by those skilled in the art.

Typical are the phosphated metal oxide coated titanium dioxide pigments, such as the phosphated alumina and phosphated alumina/ceria oxide coated varieties.

Examples of suitable commercially available titanium dioxide pigments include alumina-coated titanium dioxide pigments such as R700 and R706 (available from E. I. duPont de Nemours and Company, Wilmington Del.), alumina/phosphate coated titanium-dioxide pigments such as R796+ (available from E. I. duPont de Nemours and Company, Wilmington Del.); and alumina/phosphate/ceria coated titanium-dioxide pigments such as R794 (available from E. I. duPont de Nemours and Company, Wilmington Del.).

Process for Preparing Treated Titanium Dioxide Particles

The process for preparing a self-dispersing pigment comprises:

(a) adding a dual functional compound with an acidic aluminum salt to form an aqueous solution, wherein the dual functional compound comprises:

i an anchoring group that attaches the dual-functional compound to the pigment surface, and ii a basic amine group comprising a primary, secondary or tertiary amine;

(b) adding a base to the mixture from step (a) whereby the pH is raised to about 4 to about 9 to form a turbid solution; and (c) adding the mixture from step (b) to a slurry of inorganic particles, in particular a $TiO_2$ pigment, whereby a hydrous alumina treatment and the dual functional compound are deposited on the pigment surface.

The acidic aluminum salt comprises aluminium sulfate hydrate, or aluminum nitrate hydrate, more typically aluminum chloride hydrate, and wherein the base comprises sodium hydroxide, sodium carbonate, or more typically ammonium hydroxide. Starting with the chosen amount of dual functional compound to give the desired pigment IEP, the accompanying amount of acidic aluminum salt is chosen such that the molar ratio of dual functional compound to Al is <3, more typically about 1 to about 2.5. In this manner a mixture more prone to hydrolysis and ensuing deposition is used to augment the pigment surface. Less desirable here are the aluminum complexes of bidentate ligands such as the anion of acetylacetone (i.e. 2,4-pentanedione). Such complexes are well-known from the coordination chemistry literature, with the tris(acetylacetonato)aluminum complex known for its stability (boiling point of 314° C.) and non-polar nature, being insoluble in water.

The titanium dioxide particle can be surface treated in any number of ways well-known to those of ordinary skill in the relevant art, as exemplified by the previously incorporated references mentioned above. For example, the treatments can be applied by injector treatment, addition to a micronizer, or by simple blending with a slurry of the titanium dioxide.

The surface-modified titanium dioxide can be dispersed in water at a concentration of below about 10 weight percent, based on the entire weight of the dispersion, typically about 3 to about 5 weight percent using any suitable technique known in the art. An example of a suitable dispersion technique is sonication. The surface-modified titanium dioxide of this disclosure is cationic. The isoelectric point, determined by the pH value when the zeta potential has a value of zero, of the surface-modified titanium dioxide of this disclosure has an isoelectric point greater than 8, typically greater than 9, even more typically in the range of about 9 to about 10. The isoelectric point can be determined using the zeta potential measurement procedure described in the Examples set forth herein below. The amount of deposited dual functional compound allows control of the isoelectric point of at least 8.0, more typically between 8.0 and 9.0, which can be beneficial in facilitating the dispersion and/or flocculation of the particulate compositions during plant processing and décor paper production. Having a high IEP means that the pigment particle possesses a cationic charge under conditions when the pigment is introduced into the décor paper furnish. The cationic pigment surface, possessing sufficient charge at pH<7, is more likely to interact with the negatively charged paper fibers and less likely to adsorb cationic wet strength resin.

Typically, the particle to particle surface treatments are substantially homogenous. By this we mean that each core particle has attached to its surface an amount of alumina or aluminophosphate such that the variability in alumina and phosphate levels among particles is so low as to make all particles interact with water, organic solvent or dispersant molecules in the same manner (that is, all particles interact with their chemical environment in a common manner and to a common extent). Typically, the treated titanium dioxide particles are completely dispersed in water to form a slurry in less than 10 minutes, more typically less than about 5 minutes. By "completely dispersed" we mean that the dispersion is composed of individual particles or small groups of particles created during the particle formation stage (hard aggregates) and that all soft agglomerates have been reduced to individual particles.

After treatment according to this process the pigment is recovered by known procedures including neutralization of the slurry and if necessary, filtration, washing, drying and frequently a dry grinding step such as micronizing. Drying is not necessary, however, as a slurry of the product can be used directly in preparing paper dispersions where water is the liquid phase.

Applications

The treated titanium dioxide particles may be used in paper laminates. The paper laminates of this disclosure are useful as flooring, furniture, countertops, artificial wood surface, and artificial stone surface.

Décor Paper

Décor paper may contain fillers such as treated titanium dioxide prepared as described above and also additional fillers. Some examples of other fillers include talcum, zinc oxide, kaolin, calcium carbonate and mixtures thereof.

The filler component of the decorative paper can be about 10 to about 65% by weight, in particular about 30 to about 45% by weight, based on the total weight of the décor paper. The basis weight of the décor paper base can be in the range of about 30 to about 300 g/m², and in particular about 90 to about 110 g/m². The basis weights are selected as a function of the particular application.

To form a paper sheet, the titanium dioxide suspension can be mixed with pulp, for example refined wood pulp such as eucalyptus pulp, in an aqueous dispersion. The pH of the pulp dispersion is typically about 6 to about 8, more typically about 7 to about 7.5. The pulp dispersion can be used to form paper by conventional techniques.

Coniferous wood pulps (long fiber pulps) or hardwood pulps such as eucalyptus (short fibered pulps) and mixtures thereof are useful as pulps in the manufacture of décor paper base. It is also possible to use cotton fibers or mixtures all these types of pulps. A mixture of coniferous wood and hardwood pulps in a ratio of about 10:90 to about 90:10, and in particular about 30:70 to about 70:30 can be useful. The pulp can have a degree of beating of 20° to about 60° SR according to Schopper-Riegler.

The décor paper may also contain a cationic polymer that may comprise an epichlorohydrin and tertiary amine or a quaternary ammonium compound such as chlorohydroxypropyl trimethyl ammonium chloride or glycidyl trimethyl ammonium chloride. Most typically the cationic polymer is a quaternary ammonium compound. Cationic polymers such as wet strength enhancing agents that include polyamide/polyamine epichlorohydrin resins, other polyamine derivatives or polyamide derivatives, cationic polyacrylates, modified melamine formaldehyde resins or cationized starches are also useful and can be added to form the dispersion. Other resins include, for example, diallyl phthalates, epoxide resins, urea formaldehyde resins, urea-acrylic acid ester copolyesters, melamine formaldehyde resins, melamine phenol formaldehyde resins, phenol formaldehyde resins, poly(meth)acrylates and/or unsaturated polyester resins. The cationic polymer is present in the amount of about 0.5 to about 1.5%, based on the dry polymer weight to the total dry weight pulp fibers used in the paper.

Retention aids, wet-strength, retention, sizing (internal and surface) and fixing agents and other substances such as organic and inorganic colored pigments, dyes, optical brighteners and dispersants may also be useful in forming the dispersions and may also be added as required to achieve the desired end properties of the paper. Retention aids are added in order to minimize losses of titanium dioxide and other fine components during the papermaking process, which adds cost, as do the use of other additives such as wet-strength agents.

Examples of papers used in paper laminates may be found in U.S. Pat. No. 6,599,592 (the disclosure of which is incorporated by reference herein for all purposes as if fully set forth) and the above-incorporated references, including but not limited to U.S. Pat. Nos. 5,679,219, 6,706,372 and 6,783,631.

As indicated above, the paper typically comprises a number of components including, for example, various pigments, retention agents and wet-strength agents. The pigments, for example, impart desired properties such as opacity and whiteness to the final paper, and a commonly used pigment is titanium dioxide.

The treated titanium dioxide particle can be used to prepare the décor paper in any of the customary ways, wherein at least a portion, and typically all of the titanium dioxide pigment typically used in such papermaking is replaced with the treated titanium dioxide pigment.

As indicated above, the décor paper in accordance with the present disclosure is an opaque, cellulose pulp-based sheet containing a titanium dioxide pigment component in an amount of about 45 wt % or less, more typically from about 10 wt % to about 45 wt %, and still more typically from about 25 wt % to about 42 wt %, wherein the titanium dioxide pigment component comprises the all or some of the treated titanium dioxide particle of this disclosure. In one typical embodiment, the treated titanium dioxide pigment component comprises at least about 25 wt %, and more typically at least about 40 wt % (based on the weight of the titanium dioxide pigment component) of the treated titanium dioxide pigment of this disclosure. In another typical embodiment, the titanium dioxide pigment component consists essentially of the treated titanium dioxide pigment of this disclosure. In yet another typical embodiment, the titanium dioxide pigment component comprises substantially only the treated titanium dioxide pigment of this disclosure.

Paper Laminates

Paper laminates in accordance with the present disclosure can be made by any of the conventional processes well known to those of ordinary skill in the relevant art, as described in many of the previously incorporated references.

Typically, the process of making paper laminates begins with raw materials—impregnating resins such as phenolic and melamine resins, brown paper (such as kraft paper) and high-grade print paper (a laminate paper in accordance with the present disclosure).

The brown paper serves as a carrier for the impregnating resins, and lends reinforcing strength and thickness to the finished laminate. The high-grade paper is the decorative sheet, for example, a solid color, a printed pattern or a printed wood grain.

In an industrial-scale process, rolls of paper are typically loaded on a spindle at the "wet end" of a resin treater for impregnation with a resin. The high-grade (decorative) surface papers are treated with a clear resin, such as melamine resin, so as to not affect the surface (decorative) appearance of the paper. Since appearance is not critical for the brown paper, it may be treated with a colored resin such as phenolic resin.

Two methods are commonly used to impregnate the paper with resin. The usual way (and the fastest and most efficient) is called "reverse-roll coating." In this process, the paper is drawn between two big rollers, one of which applies a thin coating of resin to one side of the paper. This thin coating is given time to soak through the paper as it passes through to a drying oven. Almost all of the brown paper is treated by the reverse-roll process, because it is more efficient and permits full coating with less resin and waste.

Another way is a "dip and squeeze" process, in which the paper is drawn through a vat of resin, and then passed through rollers that squeeze off excess resin. The surface (decorative) papers are usually resin is impregnated by the dip-and-squeeze process because, although slower, it permits a heavier coating of the impregnating resin for improving surface properties in the final laminate, such as durability and resistance to stains and heat.

After being impregnated with resin, the paper (as a continuous sheet) is passed through a drying (treater) oven to the "dry end," where it is cut into sheets.

The resin-impregnated paper should have a consistent thickness to avoid unevenness in the finished laminate.

In the assembly of the laminate components, the top is generally the surface paper since what the finished laminate looks like depends mainly on the surface paper. A topmost "overlay" sheet that is substantially transparent when cured may, however, be placed over the decorative sheet, for example, to give depth of appearance and wear resistance to the finished laminate.

In a laminate where the surface paper has light-hued solid colors, an extra sheet of fine, white paper may be placed beneath the printed surface sheet to prevent the amber-colored phenolic filler sheet from interfering with the lighter surface color.

The texture of the laminate surface is determined by textured paper and/or a plate that is inserted with the buildup into the press. Typically, steel plates are used, with a highly polished plate producing a glossy finish, and an etched textured plate producing a matte finish.

The finished buildups are sent to a press, with each buildup (a pair of laminates) is separated from the next by the above-mentioned steel plate. In the press, pressure is applied to the buildups by hydraulic rams or the like. Low and high pressure methods are used to make paper laminates. Typically, at least 800 psi, and sometimes as much as 1,500 psi pressure is applied, while the temperature is raised to more than 250° F. by passing superheated water or steam through jacketing built into the press. The buildup is maintained under these temperature and pressure conditions for a time (typically about one hour) required for the resins in the resin-impregnated papers to re-liquefy, flow and cure, bonding the stack together into a single sheet of finished, decorative laminate.

Once removed from the press, the laminate sheets are separated and trimmed to the desired finished size. Typically the reverse side of the laminate is also roughened (such as by sanding) to provide a good adhesive surface for bonding to one or more substrates such as plywood, hardboard, particle board, composites and the like. The need for and choice of substrate and adhesive will depend on the desired end use of the laminate, as is recognized by one of ordinary skill in the relevant art.

The examples which follow, description of illustrative and typical embodiments of the present disclosure are not intended to limit the scope of the disclosure. Various modifications, alternative constructions and equivalents may be employed without departing from the true spirit and scope of the appended claims.

EXAMPLES

Isoelectric Point Characterization Using the ZetaProbe (Colloidal Dynamics).

A 4% solids slurry of the pigment was placed into the analysis cup. The electrokinetic sonic amplitude (ESA) probe and pH probe were submerged into the agitated pigment suspension. Subsequent titration of the stirred suspension was accomplished using 2 N KOH as base and 2 N $HNO_3$ as acid titrants. Machine parameters were chosen so that the acid-bearing leg was titrated down to pH 4 and the base-bearing leg was titrated up to pH 9. The zeta potential was determined from the particle dynamic mobility spectrum which was measured using the ESA technique described by O'Brien, et. al*. The pigment isoelectric point was typically determined by interpolating where the zeta potential equals zero along the pH/zeta potential curve.

*O'Brien R. W., Cannon D. W., Rowlands W. N. *J. Colloid Interface Sci.* 173, 406-418 (1995).
O'Brien R. W., Jones A., Rowlands W. N. *Colloids and Surfaces A* 218, 89-101 (2003).

Example 1

200 g. of a 30% (w/w) slurry of an amorphous alumina coated titanium dioxide pigment (DuPont R-796) is charged into a jacketed 250 mL beaker and heated to 55° C. The slurry is stirred throughout the course of surface treatment using a propeller blade attached to an overhead stirrer. The pH of this slurry measures 5.5 at 55° C. 1.5 g. of a 43% sodium aluminate sol (24% $Al_2O_3$ content, about 1% $Al_2O_3$ based on pigment weight) is charged into a 5 cc syringe. The sol is added at a rate of 0.15 mL/min so that time for complete addition occurs within 10 min. The pH is allowed to rise to 10, at which pH simultaneous addition of 20% HCl solution is commenced to maintain a pH of 10. After aluminate addition is complete, 0.6 g. (7 mmol %) of 3-(2-aminoethyl)-2,4-pentanedione is added to the stirred slurry. pH is adjusted to 10 and held for 30 min. After this period the pH is decreased to 5.5 by further addition of 20% HCl and held at pH 5.5 for 30 min. The slurry is vacuum filtered through a Buchner funnel fitted with a Whatman #2 paper. The resulting cake is washed with 4×100 mL of deionized water, transferred onto a Petri dish, and dried at 110° C. for 16 hrs. The dried cake is ground with a mortar and pestle. A 10% solids slurry of this pigment is expected to give a pH of 6.5. A 4% solids slurry of this pigment is expected to give an IEP (ZetaProbe) of 8.9. As a comparative example, the starting R-796 pigment alone gave an IEP of 6.9.

Example 2

200 g. of a 30% (w/w) slurry of an amorphous alumina coated titanium dioxide pigment (DuPont R-796) is charged into a jacketed 250 mL beaker and heated to 55° C. The slurry is stirred using a propeller blade attached to an overhead stirrer. 1.5 g. of a 43% sodium aluminate sol (24% $Al_2O_3$ content, about 1% $Al_2O_3$ based on pigment weight) is charged into a 5 cc syringe. The sol is added at a rate so that addition occurs within 10 min. pH is allowed to rise to 10 and simultaneous addition of 20% HCl solution is commenced to maintain a pH of 10. After aluminate addition is completed, 3.0 g. (5 mmol %) of the Jeffamine® ED-900 adduct of 3-oxo-butanamide is added to the stirred slurry. pH is adjusted to 10 and held for 30 min. After this period the pH is decreased to 5.5 by further addition of 20% HCl and held at pH 5.5 for 30 min. The slurry is filtered, washed, dried and ground as described in Example 1. A 10% solids slurry of this pigment is expected to give a pH of 6.5. A 4% solids slurry of this pigment is expected to give an IEP (ZetaProbe) of 8.9.

Example 3

3330 g. of a 30% (w/w) solids R-796 slurry (i.e. enough to yield about 1 Kg. dried pigment) is charged into a 5 L stainless steel pail and heated to 55° C. on a hot plate. The slurry is stirred throughout using a propeller blade attached to an overhead stirrer. 20.0 g. of a 43% sodium aluminate sol (24% $Al_2O_3$ content) is charged into a 20 cc syringe. The sol is added at a rate so that addition is completed within 10 min. The pH is allowed to rise to 10 and maintained at pH of 10 with simultaneous addition of 20% HCl solution. After aluminate addition is completed, 7.25 g. (5 mmol %) of N-(2-aminoethyl)-3-oxo-butanamide is added to the stirred slurry. The pH is adjusted to 10 and held for 30 min. After this period, the pH is decreased to 5.5 by further addition of 20% HCl and held for 30 min. The slurry is vacuum filtered through a large Buchner funnel fitted with Whatman #2 paper. The resulting cake is washed with deionized water until the conductivity of the filtrate drops to <0.2 mS/cm. The wet cake is transferred into an aluminum pan and dried at 110° C. for 16 hrs. The dried cake is ground and sifted through a 325 mesh screen. Final grinding of this material is accomplished in a steam jet mill. A 10% solids slurry of this pigment is expected to give a pH of 6.5. A 4% solids slurry of this pigment is expected to give an IEP (ZetaProbe) of 8.9.

What is claimed is:

1. A self-dispersing pigment having an isoelectric point of at least about 8, comprising an inorganic particle treated sequentially by
   (a) hydrolyzing an aluminum compound or basic aluminate to deposit a hydrous alumina surface; and
   (b) adding a dual-functional compound comprising
      i. an anchoring group that attaches the dual-functional compound to the pigment surface selected from a carboxylic acid functional group, a di-carboxylic acid group, an oxoanion functional group, a 1,3-diketone, 3-ketoamide, derivative of 1,3-diketone, or derivative of 3-ketoamide, and
      i. ii a basic amine group comprising a primary, secondary or tertiary amine, and
      ii. a tethering group that chemically connects the anchoring group to the basic amine group wherein the tethering group comprises an alkyl chain of 1-8 carbon atoms; a carbon atom, an oxygen atom, a nitrogen atom, a phosphorus atom, a sulfur atom; or a polyetheramine comprising poly(oxyethylene) or poly(oxypropylene), or mixtures thereof; whereby the weight average molecular weight of the polyetheramine tether is about 220 to about 2000.

2. The self-dispersing pigment of claim 1 wherein inorganic particle is ZnO, $TiO_2$, $SrTiO_3$, $BaSO_4$, $PbCO_3$, BaTiO3, $Ce_2O_3$, $Al_2O_3$, $CaCO_3$ or $ZrO_2$.

3. The self-dispersing pigment of claim 2 wherein the inorganic particle is a titanium dioxide pigment having a surface area of at least about 10 $m^2/g$.

4. The self-dispersing pigment of claim 1 wherein the anchoring group is a carboxylic acid functional group that comprises acetate or salts thereof or a di-carboxylic acid group that comprises malonate, succinate, glutarate, adipate or salts thereof.

5. The self-dispersing pigment of claim 1 wherein the anchoring group is a 1,3-diketone or derivative of 1,3-diketone selected from 2,4-pentanedione, 3-(2-aminoethyl)-2,4-pentanedione, or a derivative of 2,4-pentanedione substituted at C-3 with ammine, an amine-containing functional group or salts thereof.

6. The self-dispersing pigment of claim 1 wherein the anchoring group is an oxoanion functional group selected from a substituted phosphate, phosphonate, sulfate, or sulfonate.

7. The self-dispersing pigment of claim 3 wherein the basic amine comprises ammine; an N-alkyl amine of 1 to 8 carbon atoms; an N-cycloalkyl amine of 3 to 6 carbon atoms; an N,N-dialkyl amine of 2 to 16 carbon atoms; N,N-dicycloalkyl amine of 6 to 12 carbon atoms; or mixtures of both alkyl and cycloalkyl substituents.

8. The self-dispersing pigment of claim 3 wherein the dual functional compound comprises alpha-amino acids selected from the group consisting of lysine, argenine, aspartic acid and salts thereof or alpha-omega aminoacids selected from the group consisting of beta-alanine, gamma-aminobutyric acid, epsilon-aminocaproic acid and salts thereof.

9. The self-dispersing pigment of claim 3 wherein the dual-functional compound comprises
   (i) an aminomalonate derivative having the structure:

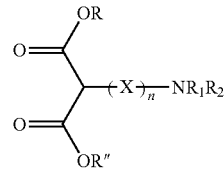

wherein X is a tethering group that chemically connects the anchoring group to the basic amine group;
R' and R" are each individually selected from hydrogen, alkyl, cycloalkyl, alkyl-aryl, alkenyl, cycloalkenyl, alkene, alkylene, arylene, alkylarylene, arylalkylene or cycloalkylene;
$R_1$ and $R_2$ are each individually selected from hydrogen, alkyl, cycloalkyl, alkenyl, cycloalkenyl, alkene, alkylene, or cycloalkylene; and n=0-50;
(ii) an aminosuccinate derivative having the structure:

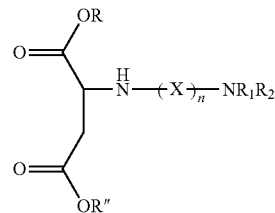

wherein X is a tethering group that chemically connects the anchoring group to the basic amine group;
R' and R" are each individually selected from hydrogen, alkyl, cycloalkyl, alkyl-aryl, alkenyl, cycloalkenyl, alkene, alkylene, arylene, alkylarylene, arylalkylene or cycloalkylene;
$R_1$ and $R_2$ are each individually selected from hydrogen, alkyl, cycloalkyl, alkenyl, cycloalkenyl, alkene, alkylene, or cycloalkylene; and n=0-50;
(iii) a 2,4-pentanedione derivative having the structure:

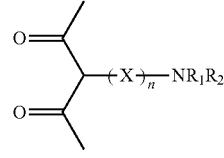

wherein X is a tethering group that chemically connects the anchoring group to the basic amine group;
$R_1$ and $R_2$ are each individually selected from hydrogen, alkyl, cycloalkyl, alkenyl, cycloalkenyl, alkene, alkylene, and cycloalkylene; and
n=0-50; or
(iv) a 3-ketobutanamide derivative having the structure:

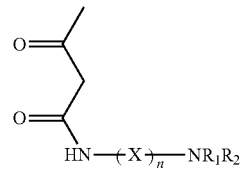

wherein X is a tethering group that chemically connects the anchoring group to the basic amine group;

$R_1$ and $R_2$ are each individually selected from hydrogen, alkyl, cycloalkyl, alkenyl, cycloalkenyl, alkene, alkylene, and cycloalkylene.

10. The self-dispersing pigment of claim 9 wherein the tethering group "X" comprises:
   (a) an alkyl chain of 1-8 carbon atoms;
   (b) a polyether chain comprising poly(oxyethylene) or poly(oxypropylene), or mixtures thereof whereby the weight average molecular weight of the tethering group is about 220 to about 2000; or
   (c) polyetheramine co-polymers comprising both oxoethylene and oxopropylene monomers.

11. The self-dispersing pigment of claim 9 wherein R' and R" are hydrogen, methyl or ethyl and $R_1$ and $R_2$ are hydrogen, methyl, ethyl or propyl.

12. The self-dispersing pigment of claim 9 wherein the dual-functional compound is an aminomalonate derivative selected from methyl ester of 2-(2-aminoethyl)malonic acid or an ethyl ester of 2-(2-aminoethyl)malonic acid or 2-(2-aminoethyl)dimethylmalonate.

13. The self-dispersing pigment of claim 9 wherein the dual-functional compound is an aminosuccinate derivative selected from methyl ester of N-substituted aspartic acid, an ethyl ester of N-substituted aspartic acid or N-(2-aminoethyl)aspartic acid.

14. The self-dispersing pigment of claim 9 wherein the dual-functional compound is a 3-ketobutanamide (amidoacetate) derivative selected from an ethylenediamine amide, a diethylenetriamine amide or N-(2-aminoethyl)-3-oxo-butanamide.

15. The self-dispersing pigment of claim 3 wherein the aluminum compound is made from the salts comprising aluminium chloride, aluminum sulfate, or aluminum nitrate or mixtures thereof or a basic aluminate from sources comprising sodium or potassium aluminate.

16. The self-dispersing pigment of claim 1 further comprising at least one oxide treatment comprising aluminum oxide, silicon dioxide, zirconium oxide, cerium oxide, aluminosilicate or aluminophosphate.

17. The self-dispersing pigment of claim 3 wherein the titanium dioxide pigment comprises first an oxide layer comprising at least about 4% $Al_2O_3$ and at least about 1.5% $P_2O_5$, and a second layer comprising at least about 3% $Al_2O_3$ and about 2 mmole % to about 10 mmole % of the dual functional compound, based on the total weight of the treated pigment.

* * * * *